L. COTE.

MACHINERY FOR FORMING STIFFENERS FOR BOOTS AND SHOES.

No. 7,356. Reissued Oct. 24, 1876.

Witnesses.
S. N. Piper
S. M. Wheller

Louis Cote
by his attorney.
R. H. Eddy

N. PETERS, Photo-Lithographer, Washington, D. C.

UNITED STATES PATENT OFFICE.

LOUIS COTÉ, OF ST. HYACINTHE, QUEBEC, CANADA.

IMPROVEMENT IN MACHINERY FOR FORMING STIFFENERS FOR BOOTS AND SHOES.

Specification forming part of Letters Patent No. 147,906, dated February 24, 1874; Reissue No. 5,896, dated June 2, 1874; Reissue No. 7,356, dated October 24, 1876; application filed July 31, 1876.

*To all whom it may concern:*

Be it known that I, LOUIS COTÉ, of St. Hyacinthe, of the Province of Quebec, of the Dominion of Canada, have invented a new and useful Machine for and Improvement in the Art of Forming or Shaping Boot or Shoe Counters or Stiffeners; and do hereby declare the same to be described as follows, reference being had to the accompanying drawings, of which—

Figure 1:
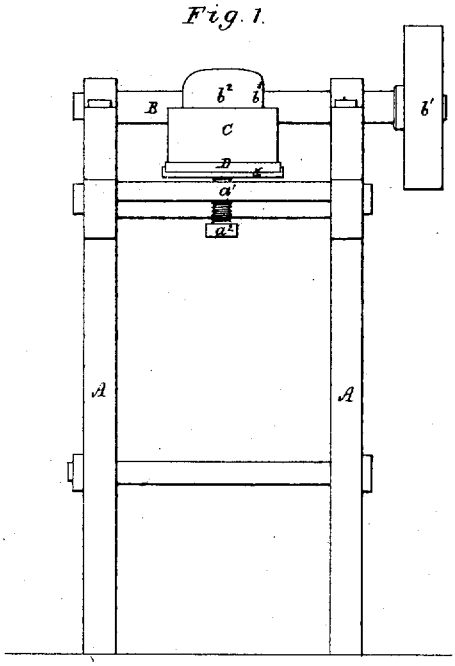
Figure 2:
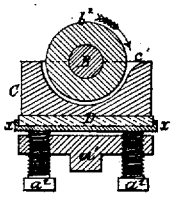
Figure 3:
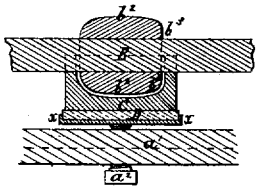
Figure 4:
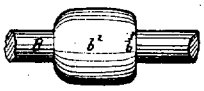

Figure 1 is a front elevation of the machine. Fig. 2 is a transverse section, and Fig. 3 a longitudinal section, of the rotary head, its shaft, the mold, the elastic cushion, and its supports. Fig. 4 is a side view of the rotary head and its shaft.

The invention or machine consists, mainly, of a rotary head of a spherical, spheroidal, or sphero-cylindrical shape, fixed upon and concentrically with a rotary shaft, in combination with a stationary mold, correspondingly or approximately so concaved, whereby, by the revolution of the said rotary head within the mold, a piece of leather of suitable form introduced between them may be drawn into and through the concavity of the mold, and receive a curved form lengthwise, and be withdrawn, and thereby be adapted for use as a stiffening for a boot or shoe.

The invention also consists in such a rotary head and stationary mold, and an elastic cushion or springs arranged underneath the mold, and for it to rest on, in order that the mold, while the leather or blank may be passing through it, may yield and accommodate itself to the said leather or blank as it may vary in thickness.

The invention further consists in the combination of such a rotary head, stationary mold, and elastic cushion or bed with a support-plate and adjusting-screws applied thereto, and a bed-plate or bar, all being as hereinafter explained, and as shown in the accompanying drawings.

The invention further consists in the art or process herein described of setting to shape a heel counter or stiffener, such consisting in pressing the blank, by means of a roller or former, against a stationary concave molding-surface, and at the same time moving or sliding such blank along against such surface, all being essentially as set forth.

The blank or piece of leather or material to be bent by the machine is usually semi-elliptical in form, or approximately so, and by being subjected to the action of the machine will not only be curved longitudinally and laterally concavo-convex, but will be formed either with or without a plaited lip or flange, as may be desirable.

In the manufacture of a counter or heel-stiffener it is important that the body or part above the flange should have a permanent set of a concave shape, which cannot be accomplished with dies as commonly used, as the material, especially if of leather-board, on being released therefrom, has a tendency to resume its normal shape, in consequence of its inherent elasticity. Heating the dies only partially overcomes the difficulty. My process effectually accomplishes the desired result, owing to the friction on the outer surface of the counter, and the heat generated in forcing the counter through the mold by the roll or form, which at the same time presses it into the mold, and aids in giving to the counter its proper shape.

In the drawings, A denotes the frame for supporting the operative parts, especially the shaft B, carrying the rotary head $b^2$, arranged on it as represented. The shaft is provided with a pulley, $b^1$, or other suitable means of revolving it. The mold (shown at C) is a metallic block, formed with a concavity, the arc of a circle in its transverse section, and in other respects the counterpart or approximate counterpart of that portion of the head which is within it, all being as shown. This mold, placed underneath the head, rests on a cushion plate or block, D, of indian-rubber, supported on a metallic plate, $x$. The plate $x$ rests on screws $a^2 a^2$, screwed into and through the bar $a^1$ of the frame A.

In Fig. 2 the direction of revolution of the head is denoted by an arrow, the mold, where it is first to receive the leather, being rounded, or made with a mouth, as shown at $c'$. Those parts of the mold and the head by which the plaited lip or flange is produced are shown at $b^3$ in Fig. 3.

In using the machine, the sheet or piece of leather is to be introduced endwise into the mouth $c'$, when it will be at once seized by the rotary head and drawn through the mold.

The piece will be bent, flanged, and plaited, or reduced to the requisite shape.

If desirable, the head may be grooved on its outer surface to facilitate its grasp or hold on the leather or blank. The inner surface of the mold, however, should be very smooth.

I do not claim the heel-rand-turning machine described in the United States Patent No. 138,257, dated April 29, 1873, such machine being constructed and operating very differently from the heel counter or stiffener forming machine hereinbefore specified.

What I claim as my invention is as follows:

1. The combination, with the continuously-moving former $b^2$, of the stationary die or mold C, formed to impart both end and peripheral compression to a counter-blank inserted between the former and die, substantially as and for the purpose set forth.

2. The combination of the shaft B, the rotary head $b^2$, the mold $c$, and the elastic cushion D, supported on a bed or plate, $x$.

3. The combination of the rotary shaft B, head $b^2$, the mold $c$, elastic cushion, the support-plate $u$, bar $a^1$, and adjusting-screws $a^2$, all being substantially as explained.

4. The process of forming and setting heel stiffeners or counters for boots and shoes, consisting in subjecting the blank to compression between a continuously-moving former and a stationary die, whereby both rolling and molding action is obtained at one and the same operation.

LOUIS COTÉ.

Witnesses:
M. E. BERNIER,
ROBERT DÉ CHÊNES.